United States Patent [19]

van Kettenbroek

[11] 4,383,613

[45] May 17, 1983

[54] GRADING DEVICE

[75] Inventor: Hendrik J. van Kettenbroek, Barneveld, Netherlands

[73] Assignee: Moba Holding Barneveld B.V., Netherlands

[21] Appl. No.: 304,302

[22] Filed: Sep. 21, 1981

[30] Foreign Application Priority Data

Sep. 22, 1980 [NL] Netherlands ........................ 8005261

[51] Int. Cl.[3] ........................................ A01K 43/08

[52] U.S. Cl. ........................................ 209/514

[58] Field of Search ............... 209/513, 515, 514, 512, 209/592

[56] References Cited

U.S. PATENT DOCUMENTS 3,432,034 3/1969 Mosterd ............................ 209/514

FOREIGN PATENT DOCUMENTS 6512100 3/1967 Netherlands .

130266 12/1970 Netherlands .

211663 10/1972 Netherlands .

144209 4/1975 Netherlands .

647486 12/1950 United Kingdom .

*Primary Examiner*—Allen N. Knowles

*Attorney, Agent, or Firm*—Larson and Taylor

[57] ABSTRACT

Device for grading or sorting objects such as eggs, provided with weighing devices which are located in at least two mutually parallel endless tracks and are adapted to be moved one after the other by conveying members along said tracks, each of said weighing devices being provided with a dischargeable gripper. Along said tracks devices being mounted for feeding objects to said grippers, each of said tracks having a part (A) in which said weighing devices are free to reach an equilibrium position and further separate discharge stations being provided near each of said tracks, each of said stations being allotted to a predetermined weight class of the objects.

9 Claims, 5 Drawing Figures

GRADING DEVICE

The invention relates to a device for grading or sorting objects such as eggs, provided with conveying members for moving weighing devices the one after the other along an endless track, each of said weighing devices having a dischargeable gripper, along said track a device being mounted for feeding objects to the grippers, said track having a part in which said weighing devices are free to reach an equilibrium position, the furtheron along said track a number of discharge stations being located, each of which is alloted to a predetermined weight class of the objects.

Such devices are widely used in practice and for instance depicted or elucidated in the U.S. Pat. Nos. 3,528,572; 3,370,691; 3,754,760; 3,703,309; 3,749,260 and Dutch patent specification No. 137,079.

Though said devices in principle can be used for any type of object in practice they are mainly used for eggs, specially because eggs need a very soft handling and the devices of this type enable a very soft handling of the objects. A further important advantage of these known devices is their high weighing accuracy.

An important problem with such devices is the capacity that is the number of objects to be handled in a predetermined time. Because all objects are present in the weighing devices that move in a row the one after the another this capacity is determined by the speed of movement of the weighing devices and the number of these devices in a predetermined distance. Both these factors have been maximized, it being, however, impossible to increase them considerably. An increase of the speed of movement beyond the speed already realized, will lead to unacceptable situations, not only because of the difficulty to maintain a soft handling of the objects such as eggs, but also because a considerable horizontal speed of the objects at the moment of discharge at the normal working speed of the device further creates considerable difficulties, because the location where a discharged object arrives is dependent on its velocity at the moment of discharge and this velocity cannot be always the same, because the device at a moment near starting or stopping necessarily has a velocity considerably deviating from the normal working speed.

A further difficulty is that the velocity with which the discharged objects are removed, for instance an egg tray that is removed after it has been filled with eggs, is limited. These movements are stepwise, so that considerable accelleration and decellerations have to be used to carry them out in very short time periods.

Still a further difficulty is, that it is difficult to have the whole device running smoothly without vibrations or noise, it being a special difficulty that weighing devices should not be exposed to vibrations in order not to reduce the accuracy of weighing.

A further difficulty is that a higher capacity of the device preferably should not be combined with a considerable increase in occupied floor area or personel demand.

The invention aims to maintain the soft handling of the objects and the high weighing accuracy and nevertheless to increase the capacity considerably without substantial increase in floor area.

The above objects are attained according to the invention by providing that the weighing devices are located in at least two mutually parallel tracks, said conveying members being adapted to move said weighing devices along said at least two tracks, separate discharge stations being allotted of each of said tracks.

The United Kingdom patent specification No. 647,486 shows a grading device having stationary weighing devices cooperating with pivotably mounted trays. These trays may be mounted in two parallel tracks of a conveyance mechanism. A finger of a tray bears on a bar of a stationary weighing device, so that this device has to assume its final position before the finger of the next tray bears on the bar of the weighing device. This means, that the distance from one tray to the next cannot be smaller than the distance in which a finger bears on said bar of the weighing device. This latter distance devided by the velocity of the tray equals the time available to a weighing device to reach its final position. With the invention this time equals the part of the track in which the weighing devices are free to reach their equilibrium position, devided by the velocity of the movement of the weighing devices, which time is many times longer than the time available with the construction known from this United Kingdom patent specification, because said part of the track can be very many times the length of the track occupied by a weighing device. With equal time for the weighing devices to reach their equilibrium position, that means equal weighing accuracy, this known device consequently is many time slower than the known devices that form the starting point for this invention.

With the invention it is important to combine a simple and reliable construction with a smooth and almost vibration free working of the device. According to a further elaboration of the invention a simple construction having only one driving member for two parallel tracks of weighing devices. which in practice allows a high velocity and gives nevertheless reliable weighing results, is characterierzed in that said driving member is connected to bridge members extending perpendicularly to said tracks, each of said bridge members supporting at least one weighing device in each of said at least two tracks.

In order to orient these bridge members it is provided according to a further elaboration of the invention that said parallel tracks consist of circle arc sections and straight sections forming together a closed loop, said bridge members being provided with distance members adapted to engage distance members of other bridge members, distance members located at the outer side of the closed loop engaging each other in the straight sections and discharge members inside said closed loop engaging each other at the circle arc sections. Herewith it is obtained that the bridge members as well in the straight parts of the track as in the circular parts, orient each other such that pivot movements about a vertical axis of the one bridge member with respect to the next are prevented.

Preferably it is provided that said bridge members at their ends are supported by means of rollers on guide surfaces and in that said drive members are connected to said bridge members at a location between said ends.

In order to prevent oscillation of the bridge members about a horizontal axis herewith it is preferably provided that the bridge members are provided with horizontal guide surfaces cooperating with guide members fixedly connected to nearby bridge members.

It is remarked, that with the invention the capacity of a device is about doubled, but that the overall device is only little increased. This is so, because discharge stations in duplicate, that is to say two discharge stations for one weight class of the objects were already used in many case, so that in fact a very moderate increase in width of the device due to two tracks of weighing devices occurs as well as a rather small increase in length due to a somewhat greater length of the section for feeding objects to the weighing devices.

The construction with the bridge members allows to use chain wheels or other driving rotors of smaller diameter than the mutual distance of the outer tracks of weighing devices. These chain wheels or other rotors may be of simple construction cooperating with only one driving member, preferably a chain, because the bridge members are supported by their own guide rollers and can even support the driving chain. Moreover the diameter of the chain wheels can be rather small, because the track of the chain can be far inside the track of the outer weighing devices.

The invention in the following is elucidated on hand of the accompanying drawing, in which.

Figure 1:
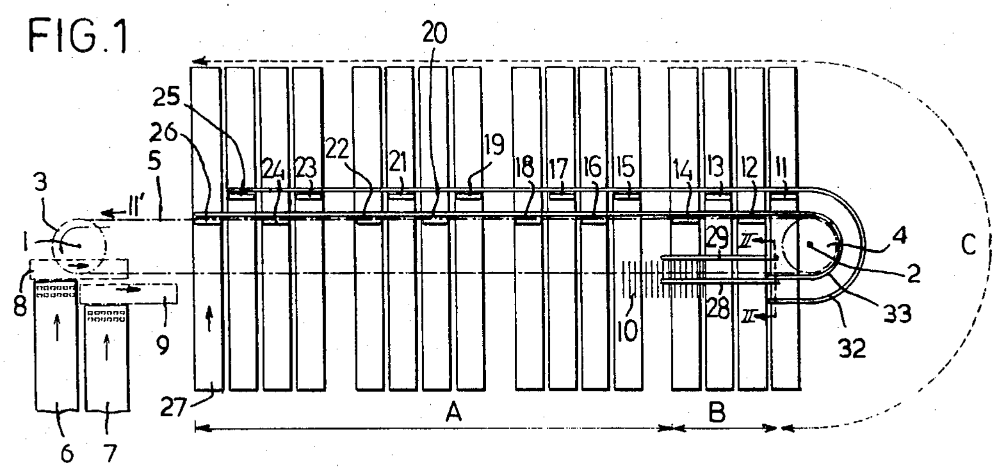
FIG. 1 shows schematically a plan view of an application of the invention in form of an egg grading machine.

In FIG. 1 references 1 and 2 indicate vertical shafts at least one of which is driven. On each of the shafts 1 and 2 a chain wheel 3 and 4 resp. are mounted. On the chain wheels 3 and 4 a chain 5 runs.

By 6 and 7 two egg feed webs known per se have been indicated, transfer devices 8 and 9 serving the purpose of filling grippers, that are mounted to chain 5. Such a transfer device has been described in the U.S. Pat. No. 3,370,691.

To the chain 5 bridge members 10 are mounted, a number of which have been schematically indicated in FIG. 1 by means of a line. In practice the whole chain 5 may be provided with such bridge members.

As will be further described each of the bridge members supports two weighing devices, which each contain a gripper for an egg.

When chain 5 moves in the direction of arrow 11' and eggs have been fed to the grippers by means of the transfer devices 8 and 9, section A serves the purpose to allow the weighing devices to come at rest; the section B to left the weighing devices cooperate with different guides 32 and 33 in dependence on the weight class of their egg; and section C to bring the weighing devices in correspondence with the guide with which they cooperate toward discharge stations allotted to the weight of the egg they contain. These discharge stations in FIG. 1 have been schematically indicated by references 11 and 12 for a first weight class; 13 and 14 for a second class; 15 and 16 for a third class; 17 and 18 for a fourth class; 19 and 20 for a fifth class; 21 and 22 for a sixth class; 23 and 24 for a seventh class and 25 and 26 for an eighth class.

The machine further contains feeding webs for empty packing material 27, one such web being provided for each discharge station. The empty packings are fed in at the lower side in FIG. 1 and the filled packings are carried off at the upper side.

In FIG. 1 magnet tracks 28 and 29 have been shown, that cooperate with magnets 30 and 31 (see FIG. 2) of the weighing devices and attract these magnets in such a way that the weighing devices assume in dependence on the weight charge region one out of a number of predetermined positions. Each of the magnet tracks 28 and 29 consists of a number of magnet strips and the magnets 30 and 31 of the weighing devices are forced by the magnet forces to assume a position in which these magnets are positioned near one of the magnet strips of the magnet tracks 28 or 29.

Guides 32 and 33 cooperating with follow rollers such as 51 (see FIG. 2) of the weighing devices and because the magnet tracks 28 and 29 cooperate with the magnets 30 and 31 resp. the follow roller of a weighing device will never hit the front side of a guide.

Figure 2:
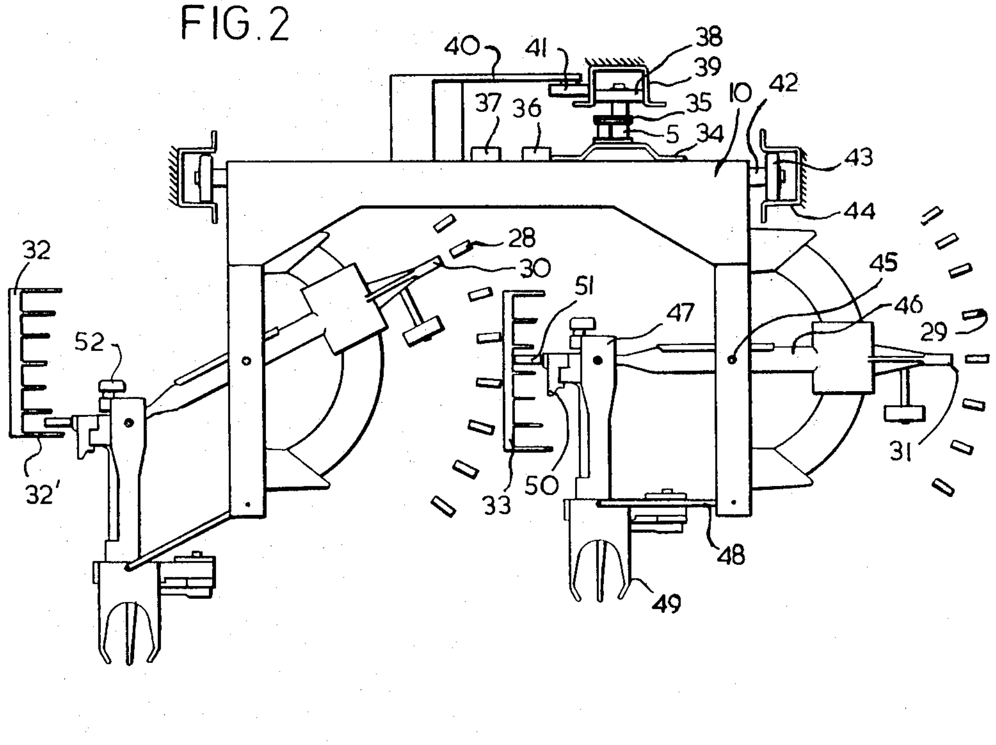
FIG. 2 shows schematically and on a larger scale a detail cross-section over the line II—II of FIG. 1.
Figure 3:
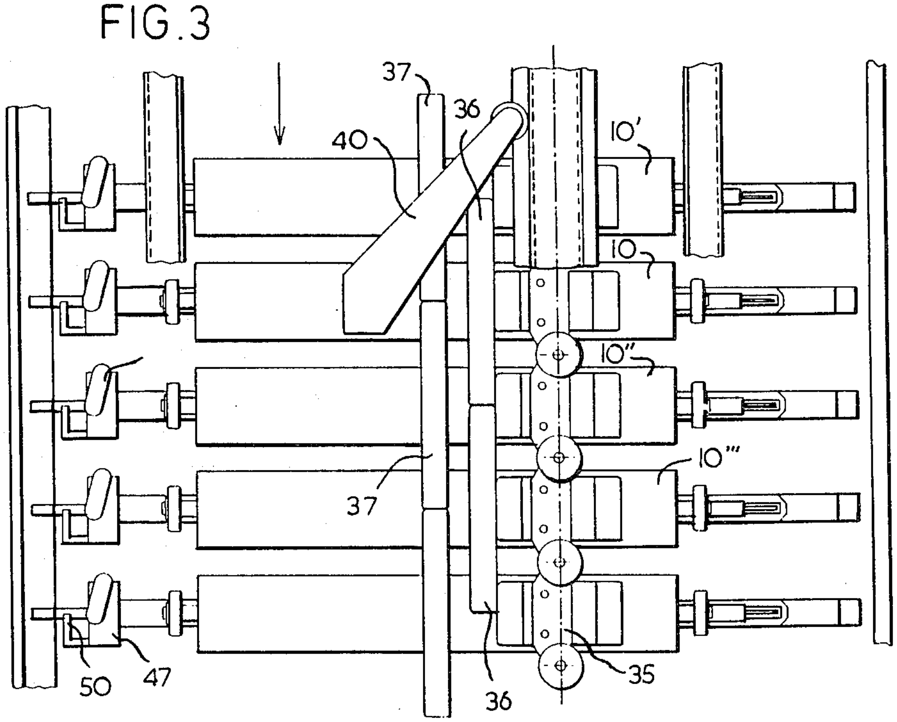
FIG. 3 shows schematically a plan view of the same scale as FIG. 2 of a part of the device.

In FIGS. 2 and 3 schematically the connection of weighing devices to the chain 5 has been shown as well as the guiding of this chain, the support and the mounting of the weighing devices, the magnet tracks 28 and 29 and the guides 32 and 33.

Each bridge member 10 has a plane upper surface to which a bucket 34 is mounted to which a link 35 of chain 5 is connected. To bridge member 10 a distance member 36 is mounted that is flush with the upper surface of bridge member 10. This distance member emerges to about half-way the nearby bridge members 10' and 10'' (FIG. 3). The bridge members 10' and 10'' support distance members 37 which lie on the upper surface of the bridge member 10 and in the situation in which the chain 5 existing of the links 35 is straight engage each other with their end faces. In the same way the distance member 36 of the bridge member 10'' engages the distance member 36 of the bridge member 10.

To the links 35 of the chain 5 guide rolls 38 have been connected that run in a guide 39.

Further a directional member 40 has been connected to the bridge member 10, which directional member at its end supports a free rotable roller 41, which runs on the outer side of the guide 39. The directional member prevents the bridge member 10 to pivot clockwise with respect to its connection to the chain. Such directional members, when used, are not necessary for each bridge member.

The bridge member 10 supports at its end shafts 42 with support rollers 43 running in fixedly mounted U-shaped guides 44. Further each bridge member supports two weighing devices, which may be of the same construction, which construction per se is not a part of this invention. Shortly it can be said that each weighing device is provided with a balance shaft 45 on which a balance arm 46 can rotate which at its end supports a dischargeable gripper 47. A link 48 connects the gripper 47 by means of two pivot points to the bridge member 10. The balance arm 46, the gripper 47, the part of the bridge member 10 between said pivot points and the link 48 together form a parallelogram mechanism.

Each gripper at its lower side has egg gripper fingers 49 that can be activated when a discharge pawl 50 hits a fixed abutment (not shown). Further each gripper 47 is provided with a rotatable follow roller 51 that can cooperate with guides 32 or 33. The follow roller 51 has been mounted to a shaft that itself can pivot about a vertical axis, such that the follow roller is pivoted away from the guides 32 or 33.

The dischargeable grippers 47 at their upper side are provided with an activation member cooperating with non shown fixedly mounted devices for closing the grippers after filling them.

Weighing devices of this type are described in the U.S. Pat. Nos. 3,703,309 and 3,528,572.

As has been clearly shown in FIGS. 2 and 3 the chain is located inside half-way the bridge member 10. This allows in the configuration of FIG. 1 to give the chain wheels 3 and 4 a reduced diameter, whereas further, as experiments have shown, a very quiet and jamming free running of the machine is obtained.

Figure 4:
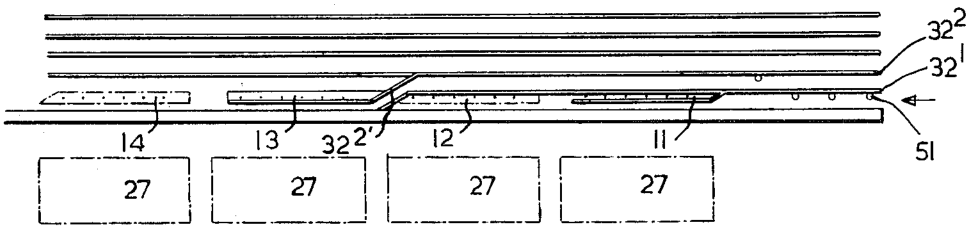
FIG. 4 shows schematically a vertical view of the manner in which guides direct the containers toward certain discharge stations.

In FIG. 4 schematically the configuration of the guides, such as 32 and 33 and the discharge stations cooperating with them have been shown. The station 11 cooperates with the grippers, of which the guide rollers 51 are located below the guide $32^1$ and each of these grippers is discharged in the discharge station 11. The guide $32^2$ conducts at its downward tilted part $32^{2'}$ the guide rollers 31 of the weighing devices which rollers are located below this guide toward the discharge station 13.

The discharge station 12 that cooperates with the other weighing devices of each bridge member has, only for localisation purposes schematically been shown with interrupted lines in FIG. 4. p It is indicated that the discharge stations all are positioned at such a level, that the weighing device is pivoted counter clockwise (as seen in FIG. 2) so that, when the gripper is discharged and the roller 51 is pivoted away from a guide such as $32^1$, $32^2$ the gripper immediately moves upward so that the chance that an already dropped egg is hit by an egg gripper arriving later on is eliminated. This construction of the gripper with egg gripper fingers and discharge mechanism is known per se and has been described in the U.S. Pat. No. 3,528,572 for instance.

Figure 5:
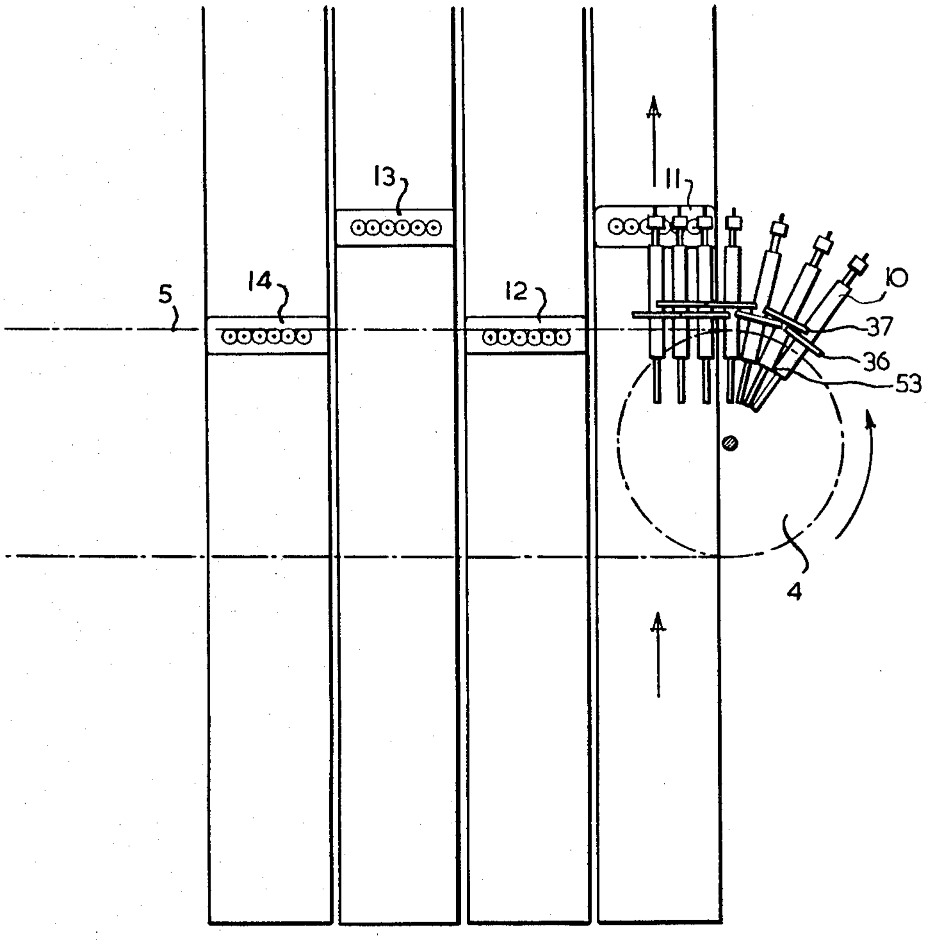
FIG. 5 shows a plan view of a part of FIG. 1 on a larger scale.

In FIG. 5 is visible that the distance members 36 and 37 do not engage adjacent distance members 36 and 37 resp. in the part of chain 5, that runs on chain wheel 4. For a correct determination of their position the bridge members 10 engage each other at their corners 53, so that these corners play the part of additional distance members. In practice this has proved to be sufficient to guarantee a quiet working of the machine without jerking, but of course it is possible to apply also at this side of the chain abutments or distance members to the bridge members.

Summarizing it can be stated that the invention provides a machine which with in other respects the same working conditions has a double capacity, wherewith only few parts of the machine have to be doubled and without introducing considerable complications. By reason of this it is possible to manufacture an egg grading machine which keeps eggs in a gripper until they have to be discharged at the ultimate discharge location, and has a large capacity without needing extreme velocities of the egg movement.

Because a considerable increase in capacity can be obtained with a machine having in principle the same dimensions or only little increased dimensions in comparison with a machine having only one track for weighing devices, the invention allows to increase the capacity without using a considerably increased floor area. Because the working speed of the machine also at a large capacity can be kept below tolerable limits the invention has the additional advantage of a very high reliability and less service or break down, than would be the case if one had tried to increase the capacity by increasing the speed of the grippers to the just tolerable limit.

What I claim is:

1. Device for grading or sorting objects such as eggs, provided with conveying members for moving weighing devices the one after the other along an endless track, each of said weighing devices having a dischargeable gripper, along said track a device being mounted for feeding objects to the grippers, said track having a part in which said weighing devices are free to reach an equilibrium position, and furtheron along said track a number of discharge stations being located, each of which is allotted to a predetermined weight class of the objects, characterized in that the weighing devices are located in at least two mutually parallel tracks, said conveying members being adapted to move said weighing devices along said at least two tracks, separate discharge stations being alotted to each of said tracks.

2. Device according to claim 1 in which said conveying members contain a driving member moving along a fixed track, characterized in that said driving member is connected to bridge members extending perpendicularly to said tracks, each of said bridge members supporting at least one weighing device in each of said at least two tracks.

3. Device according to claim 2, characterized in that said parallel tracks consist of circle arc sections and straight sections forming together a closed loop, said bridge members being provided with distance members adapted to engage distance members of other bridge members, distance members located at the outer side of the closed loop engaging each other in the straight sections and discharge members inside said closed loop engaging each other at the circle arc sections.

4. Device according to claim 2, characterized in that said bridge members at their ends are supported by means of rollers on guide surfaces and in that said drive members are connected to said bridge members at a location between said ends.

5. Device according to claim 4, characterized in that the bridge members are provided with horizontal guide surfaces cooperating with guide members fixedly connected to nearby bridge members.

6. Device according to claim 3, characterized in that guide members are formed by said distance members.

7. Device according to claim 3, characterized in that the distance members located at the outer side of the closed loop cooperate with such distance members connected to the next but one bridge member.

8. Device according to claim 4, characterized in that the driving member is a chain provided with guide rollers rotatable about vertical axes, said rollers cooperating with mainly vertical guide surfaces mounted along said track of the bridge members.

9. Device according to claim 4, characterized in that at least some of the bridge members are provided with a directional member, said directional members being provided with at least one guide roller running on a guide parallel to said tracks.

* * * * *

UNITED STATES PATENT AND TRADEMARK OFFICE

CERTIFICATE OF CORRECTION

PATENT NO. : 4,383,613

DATED : May 17, 1983

INVENTOR(S) : VAN KATTENBROEK

It is certified that error appears in the above-identified patent and that said Letters Patent is hereby corrected as shown below:

In the cover page of the patent, upper left hand side, after "Assignee:" please delete "Moba Holdings, Barneveld B.V., Netherlands" and substitute therefor --ADMINISTRATIE - EN AUTOMATISERINGSCENTRUM VULCAAN B.V., Amsterlveen, Netherlands--

Signed and Sealed this

*Thirtieth* Day of *July 1985*

[SEAL]

*Attest:*

DONALD J. QUIGG

*Attesting Officer* *Acting Commissioner of Patents and Trademarks*